United States Patent Office 2,706,359
Patented Apr. 19, 1955

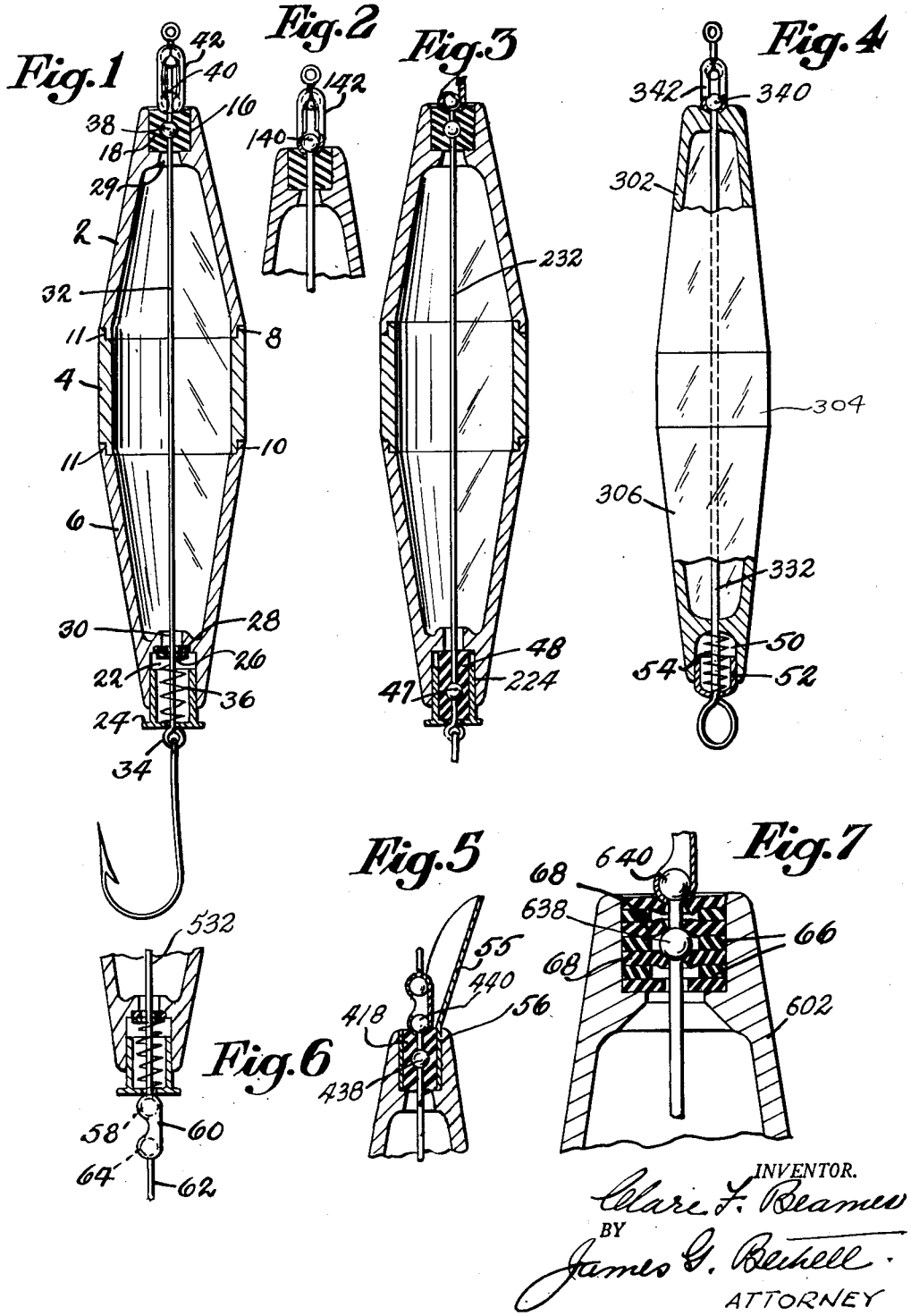

2,706,359

FISHING LURES

Clare F. Beames, West Hartford, Conn.

Application April 6, 1951, Serial No. 219,576

4 Claims. (Cl. 43—42.09)

This invention relates to fishing lures and has for one of its objects to provide a fishing lure having a hollow sectional body together with means adapted to permit the sections to be secured together quickly and to be separated readily. The body is made hollow and transparent or semi-transparent, so that material of various shapes and colors may be placed within the lure to attract fish thereto; if desired, the body may be filled with liquids of any color desired, such as red, yellow, white, black, etc. The hollow sectional body possesses another advantage in that, if desired, the same lure may be used for top water fishing and then a small weight, or water, may be placed within the lure body, so that the same is readily converted to an underwater lure.

I am aware that hollow-bodied lures have been suggested prior to my invention. However, such prior devices have certain inherent disadvantages, which my device has eliminated. It is usual in prior hollow-bodied lures to screw the sections of the body together or to employ a threaded device of some sort to hold the lure intact. The threaded members, particularly in salt water, soon become corroded, so that it is difficult and often impossible to disassemble the lure, or, if it is possible to disassemble the lure, it is very difficult to assemble the lure again, so that it is watertight.

My invention provides a sectional, hollow-bodied lure which is of such a construction that no threaded members are required to hold the lure assembled; the lure is maintained sealed at all times; the disassembling of the lure for any purpose requires but a moment, and the lure may be assembled again just as quickly; the parts are so arranged that tension on the hook when using the lure is transmitted directly to the line through the rod, and no amount of tension on the line and hook will tend to pull the sections of the lure apart nor cause the lure to leak.

In the accompanying drawings,

Fig. 1 is a sectional elevational view of one embodiment of my invention;

Fig. 2 is a fragmentary sectional elevational view showing a modification of the head section of the lure of Fig. 1;

Fig. 3 is a view similar to Fig. 1, showing another embodiment of my invention in which the tail end of the lure has been modified in construction;

Fig. 4 is a view similar to Fig. 1, showing still another embodiment of the invention;

Fig. 5 is a fragmentary sectional elevational view showing a modification of the head of the lure as compared with Fig. 3, for example;

Fig. 6 is a fragmentary sectional elevational view of the tail end of the lure, modified as compared with Fig. 1, for example; and Fig. 7 is a fragmentary sectional elevational view showing a modified form of the plug at the head of the lure as compared with Fig. 3, for example.

Referring in detail to the embodiment of my invention as illustrated in Fig. 1:

Reference numerals 2, 4, and 6 designate the head, body, and tail sections of my fishing lure. It is to be understood that three sections have been shown merely for purposes of illustration, and that two sections or more than three sections may be employed, if desired.

Some one or more of the lure sections are colored and transparent or semi-transparent. I have found that any of the clear or semi-clear Vinylite or acrylic plastics available in the open market are suitable for my purpose. Such material does not corrode readily and is sufficiently transparent for my purpose.

The head section 2 interlocks with the body section 4 at the upper end of the latter, and the upper end of the tail section 6 interlocks with the lower end of the body section. This interlocking or interfitting of the sections may be obtained in a variety of ways, but, inasmuch as I wish to avoid the use of threaded connections of any kind, I simply reduce the external diameters of the lower end of the head section 2 and of the lower end of the body section 4, as illustrated at 8 and 10, respectively, and enlarge the internal diameters of the upper end of the body section 4 and upper end of the tail section 6, as illustrated at 11, so that the reduced end of the head section will fit neatly into the enlarged upper end of the body section, and the reduced lower end of the body section will fit neatly into the enlarged upper end of the tail section with a snug fit. If it is desired to omit the body member, the reduced lower end of the head section will fit neatly into the upper end of the tail section. This provides joints which are readily kept watertight when the head and tail sections are compressed endwise, as will be explained latter, and this sealing action is promoted by the fact that the plastic material of the lure sections is slightly elastic. If desired, a heavy petrolatum may be used to seal any slight imperfections in the joints if they should occur during manufacture of the lure sections.

The outer end of the head section 2 of the lure is recessed, as shown at 16, and snugly fitting within this recess is a plug 18. This plug is of a compressible elastic material, such as rubber, natural or synthetic, fiber, or other compressible elastic material, and is bored longitudinally.

The outer end of the tail section 6 of the lure is recessed, as shown at 22, and fitting within this recess is a headed ferrule 24. This ferrule may be of metal. Within the recess 22 at the inner end of the ferrule 24 is a metal washer 26, and above this washer is a gasket washer 28 of rubber or fiber or other suitable material.

The head section 2 below the plug 18 at the base of recess 16 is bored through and splayed at the lower end, as shown at 29, and the inner end of the tail section 6 is bored through at the base of recess 22, as shown at 30.

A tie rod 32 extends the length of the lure and projects beyond the ends of the lure, the head of the ferrule 24, the washer 26, and the gasket washer 28 at the tail section, and plug 18 at the lure head being bored to receive the rod. The lower end of the tie rod is provided with an eye 34 for the attachment of a fish hook to the lure. Within the ferrule 24, surrounding the rod 32, is a coil spring 36, which always is under compression.

The upper end of the rod 32 is provided with balls or enlarged areas 38 and 40, disposed in spaced relation with respect to each other and formed rigid with the rod.

The lower element or ball 38 functions as a valve to seal the lure end against the entrance of water or other foreign material through the bore in member 18. The outer element 40 provides means for the attachment of a snap-on type of connector 42 to the tie rod, by which a line may be attached to the tie rod. This snap-on connector has been illustrated as of the swivel type. The two ball or enlarged areas 38 and 40 are spaced at such a distance apart that, in order to engage the swivel 42 with the upper ball 40, the entire lure is pressed manually downward against eye 34, compressing spring 36 and thereby forcing the end of rod 32 and element 40 above plug 18. Element 38 remains within the plug by virtue of the restraining shoulder or head of the ferrule 24, which limits the downward movement of the body members on the rod. The swivel is then attached to 40, and the downward pressure on the lure is released. The compression set up in spring 36 draws ball 40 and swivel 42 slightly into plug 18 and, at the same time, exerts pressure on elements 26 and 28. Element 40 and swivel 42 will not be drawn entirely through plug 18 because of the resistance offered by the relatively large size of the swivel as compared to the bore of the plug. Thus, the plug 18, the lower element 38 and swivel 42 and element 40 seal the upper end of the lure and washer 28 seals the lower end of the lure against entrance of liquid or leakage of liquid from within. The fact that swivel 42 is depressed in plug 18 makes its removal without depressing or contracting spring 36 difficult and tends to hold it in alinement with tie rod 32. In applying the swivel 42 to the element 40, the lure is manually depressed relatively to rod 32 until the ball 40 projects above plug 18; the swivel is swung to a horizontal position, so that the element 40 may enter opening 44 in the swivel; and then the swivel is moved lengthwise, so that the element moves into the swivel. The swivel is then swung into alinement with the rod. In this movement, the inner end of the swivel bears upon the outer end of plug 18 and eye 34 bears upon ferrule 24 which, under the action of spring 36, will impose considerable tension upon tie rod 32 and will draw the lure sections tightly together and hold them in that position. It will be appreciated, of course, that to disassemble the lure, the operations are reversed. It will be appreciated also that the plug 18 is sufficiently resilient so that the balls or enlargements 40 and 38 may be forced into or through the bore in the plug and still maintain a snug, watertight fit around them.

In the embodiment of the invention as illustrated in Fig. 2, I have eliminated the enlargement 38 of Fig. 1 and rely for sealing effect upon the end of the swivel 142 and the enlargement 140.

In the embodiment of the invention illustrated in Fig. 3, the head of the lure is the same as in Fig. 1.

At the lower end or tail of the lure of Fig. 3 I employ a ferrule 224, in which a plug 48 of rubber, fiber, or some other suitable compressible material is inserted. The tie rod 232 is provided at the tail end of the lure with a ball or enlarged area 47, so positioned on the rod as to lie intermediate the ends of the plug 48. This provides the same action as the spring 36 of Fig. 1.

It will be apparent that in this embodiment of my invention, as in the other embodiments described so far, no threaded element is employed to hold the lure assembled; that the lure will be watertight; that the tie rod 232 extends through both ends of the lure, so that all tension on the lure is taken by the tie rod, and pulling apart of the lure sections in using the lure is avoided.

In the embodiment of my invention illustrated in Fig. 4, I provide a lure embodying head section 302, body section 304, and tail section 306, held assembled by tie rod 332, which extends through the lure and projects from each end thereof.

The upper end of this rod is provided with a sealing ball or enlargement 340. The outer end of the tail section 306 of the lure is recessed, as shown at 50, and fitting within this recess with a sliding fit is a ferrule 52. The tie rod 332 passes through the ferrule. Within the ferrule and surrounding the tie rod is a spring 54, which, with the lure assembled, is under compression.

In assembling the lure, the rod 332 is passed through the lure from the outer end of the section 302 and along the lure interior and through the ferrule 52 and spring 54. The projecting lower end of the tie rod may then be bent to provide an eye for the attachment of a hook to the lure. The swivel snap-on connector 342 may then be affixed to the enlargement 340 at the head of the lure. The length of the tie rod is such that, when this is done, the sections of the lure will be held together under the tension of the spring 54. The depth of the depression 50 in the tail section 306 is somewhat greater than the length of the ferrule 52, so that the sections of the lure may be separated sufficiently, when desired, to insert a liquid or other material within the lure.

In Fig. 5, I show a construction similar to Fig. 1, for example, except that, in addition to the enlargements 438 and 440 and the compressible plug 418, I provide a fin 55 for varying the motion of the lure when being retrieved. The fin may be of plastic or metal, for example, and may be equipped with a sleeve 56, which surrounds the rubber plug 418. This sleeve, it will be understood, is a tight fit in the recess in the end of the lure section.

In Fig. 6, I show a construction similar to Fig. 1, for example, except that in lieu of an eye 34 at the tail end of the tie rod 532, I provide an enlargement 58, attached to the rod. To this may be attached a snap-on connector 60, and a fish hook 62 with the end of its shank enlarged, as seen at 64, in such a manner that it may be quickly attached to the connector.

In Fig. 7, I have illustrated on an enlarged scale a plug in the head end of the lure, which may be substituted for the plug 18 above referred to in connection with Fig. 1, for example. This plug is made up of a plurality of discs 66 and 68 of rubber or other resilient material. These discs are all of the same outside diameter and snugly fit the recess or cavity in the outer end of the head section 602 of the lure. The bores in the discs 66 are different in diameter from the bores in the discs 68. For example, the bores in the discs 66 may be twice the diameter of the bores in the discs 68. The discs 66 alternate in placement with the discs 68. This arrangement offers less resistance to the passage of the tie rod enlargements 638 and 640 without, however, affecting the water seal.

In all embodiments of my invention I have provided a sectional lure devoid of threaded elements of any kind wherein the sections are held together through the medium of a tie rod projecting through both ends of the lure. It will be appreciated also that the lure is sealed against the entry of water and moisture. It will be appreciated also that tension on the lure, as the same is being used, tends to draw the sections tighter together rather than tending to pull the tie rod out of the lure, as would be the case if, for example, the rod merely extended through the lure to the tail section and were threaded into the tail section.

It is to be understood that changes may be made in the details of construction and shapes illustrated and described without departing from the spirit and scope of the invention.

What I claim is:

1. A hollow fishing lure divided transversely into a plurality of sections; a compressible plug set into one end of the lure, and a ferrule in the other end of the lure; a tie rod passing through the lure and projecting beyond each end thereof, said rod passing through said plug and ferrule; a spring within said ferrule; a sealing washer carried by the rod adjacent said spring; and a snap fastener attachable to the end of the tie rod at the head of the lure for placing said spring under compression to seat said washer and for drawing the lure sections into watertight contact.

2. A hollow fishing lure divided transversely into a plurality of sections; a compressible plug in one end of the lure, and a ferrule in the opposite end of the lure; a tie rod extending through the lure and projecting from each end thereof, said rod passing through the plug and through said ferrule; a sealing gasket within the lure adjacent said ferrule; an enlargement on that portion of the tie rod passing through said plug; a spring within said ferrule and lying between the sealing gasket and the head of the ferrule; and a connector attachable to one end of the tie rod for moving said ferrule lengthwise to place said spring under compression to seat said gasket, in such a manner that said connector draws the lure sections into watertight contact.

3. A hollow fishing lure divided transversely into a plurality of sections; a compressible plug set into one end of the lure, and a ferrule having a sliding fit in the other end of the lure; a tie rod passing through the lure, said rod passing through said plug and through said ferrule and projecting to the exterior of the lure at each end thereof; a sealing gasket within the lure adjacent said ferrule; a spring within the ferrule surrounding the tie rod and lying beneath said gasket; an enlargement on said rod intermediate the extremities of said compressible plug; an enlargement on the end of the rod which projects beyond the plug and a snap-on connector attachable to said last-named enlargement for placing said spring under compression to seat said gasket and to draw the lure sections together in a watertight manner and to effect sealing of the lure at said plug.

4. A hollow fishing lure divided transversely into a plurality of sections; a tie rod extending through the lure lengthwise of the lure and projecting to the lure exterior at each end thereof, one projecting end of the rod being provided with means to prevent withdrawal of the rod in one direction; a ferrule on the last-mentioned end of the rod, slidably seated in a recess in the adjacent end of the lure; a spring within said ferrule mounted on said rod; an abutment on the projecting end of the tie rod at the end of the lure opposite said ferrule; and a snap connector attachable to said abutment for placing said spring under compression to draw and hold the lure sections in watertight contact.

References Cited in the file of this patent

UNITED STATES PATENTS

| | | |
|---|---|---|
| Re. 18,288 | Herlihy | Dec. 15, 1931 |
| 575,674 | Woodward | Jan. 19, 1897 |
| 1,056,494 | Blee et al. | Mar. 18, 1913 |
| 1,723,557 | Ono | Aug. 6, 1929 |
| 1,833,241 | Wright | Nov. 24, 1931 |
| 2,357,472 | Jenkins | Sept. 5, 1944 |
| 2,385,274 | Hammond | Sept. 18, 1945 |
| 2,476,088 | Gleason | July 12, 1949 |
| 2,568,488 | Cummins | Sept. 18, 1951 |